(12) United States Patent
Liu et al.

(10) Patent No.: US 10,326,933 B2
(45) Date of Patent: Jun. 18, 2019

(54) POSE ESTIMATION OF 360-DEGREE PHOTOS USING ANNOTATIONS

(71) Applicant: Google LLC, Mountain View, CA (US)

(72) Inventors: Tianqiang Liu, Mountain View, CA (US); Meng Yi, Sunnyvale, CA (US); Xin Mao, Sunnyvale, CA (US); Jacqueline Anne Lai, Mountain View, CA (US); Daniel Joseph Filip, San Jose, CA (US); Stephen Charles Hsu, San Carlos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/622,804

(22) Filed: Jun. 14, 2017

(65) Prior Publication Data

US 2018/0367730 A1  Dec. 20, 2018

(51) Int. Cl.

| | |
|---|---|
| *F16M 11/08* | (2006.01) |
| *F16M 11/20* | (2006.01) |
| *G03B 15/00* | (2006.01) |
| *G03B 15/06* | (2006.01) |
| *G03B 17/24* | (2006.01) |
| *H04N 5/232* | (2006.01) |
| *H04N 101/00* | (2006.01) |

(52) U.S. Cl.
CPC ..... *H04N 5/23238* (2013.01); *H04N 5/23248* (2013.01); *H04N 5/23258* (2013.01); *F16M 11/08* (2013.01); *F16M 11/2021* (2013.01); *G03B 15/00* (2013.01); *G03B 15/06* (2013.01); *G03B 17/24* (2013.01); *H04N 2101/00* (2013.01)

(58) Field of Classification Search
USPC .......................................................... 396/5
See application file for complete search history.

(56) References Cited

U.S. PATENT DOCUMENTS

| | | | |
|---|---|---|---|
| 8,259,994 B1 * | 9/2012 | Anguelov | G06K 9/00664 |
| | | | 382/100 |
| 9,129,148 B1 * | 9/2015 | Li | G06K 9/00268 |
| 9,558,559 B2 * | 1/2017 | Fan | G06K 9/00664 |
| 9,792,368 B1 * | 10/2017 | Amacker | G06K 9/00671 |

(Continued)

OTHER PUBLICATIONS

Wagner et al. (Real-time Panoramic Mapping and Tracking on Mobile phones, Mar. 20-24, 2010, pp. 211-218 IEEE).*

(Continued)

*Primary Examiner* — Clayton E. LaBalle
*Assistant Examiner* — Kevin C Butler
(74) *Attorney, Agent, or Firm* — Lerner, David, Littenberg, Krumholz & Mentlik, LLP

(57) ABSTRACT

This technology relates to optimizing location and orientation information of an image using known locations of places captured within the image. For example, an image and associated pose data including the image's orientation and location may be received. One or more places captured within the image may be determined, with each place having a respective known location. The image may be annotated with the one or more places. A difference between each annotation and its respective known location to obtain updated pose data of the image may be minimized and the associated pose data may be updated to the updated pose data.

20 Claims, 9 Drawing Sheets

(56) References Cited

U.S. PATENT DOCUMENTS

| | | | | |
|---|---|---|---|---|
| 2009/0248300 A1* | 10/2009 | Dunko | ............... | G06F 17/3087 |
| | | | | 701/533 |
| 2009/0307618 A1* | 12/2009 | Lawler | ................. | G06F 3/0481 |
| | | | | 715/764 |
| 2010/0002071 A1* | 1/2010 | Ahiska | .................. | H04N 5/217 |
| | | | | 348/36 |
| 2011/0169946 A1* | 7/2011 | Rudin | ...................... | G01S 5/16 |
| | | | | 348/135 |
| 2012/0300089 A1* | 11/2012 | Sbaiz | ............... | H04N 1/00323 |
| | | | | 348/222.1 |
| 2013/0016123 A1* | 1/2013 | Skarulis | ................... | G09G 5/00 |
| | | | | 345/633 |
| 2014/0362174 A1* | 12/2014 | Fan | ........................ | G06T 17/05 |
| | | | | 348/36 |
| 2015/0317511 A1* | 11/2015 | Li | ..................... | G06K 9/00288 |
| | | | | 382/118 |
| 2017/0154233 A1* | 6/2017 | Gallagher | ............. | G01C 17/34 |
| 2017/0228921 A1* | 8/2017 | Buhlmann | ............. | G06F 3/033 |
| 2017/0328730 A1* | 11/2017 | Amacker | ............... | H04W 4/02 |
| 2017/0337744 A1* | 11/2017 | Martin | ................... | G01S 19/14 |

OTHER PUBLICATIONS

Liu et al, 'A systematic approach for 2D-image to 3D-range registration in urban environments', Oct. 2007, pp. 1-8, IEEE.*

Verhoeven et al, 'Mapping by matching: a computer vision-based approach to fast and accurate georeferencing of archaeological aerial photographs', vol. 39, Issue 7, Jul. 2012, pp. 2060-2070, Journal of Archaeological science.*

Zhencheng et al., 'Fusion of Vision, GPS and 3D Gyro Data in Solving Camera Registration Problem for Direct Visual Navigation', Dec. 2006, pp. 3-12, International Journal of ITS Research, vol. 4, No. 1.*

* cited by examiner

POSE ESTIMATION OF 360-DEGREE PHOTOS USING ANNOTATIONS

BACKGROUND

Panoramic photography has become a popular and useful way to capture images. One type of panoramic image is known as a photo sphere. As an example, photo spheres may include imagery that covers the whole or portion of a sphere of view captured by a camera. For instance, a photo sphere may have a field of view that captures 360° of the features visible to the camera in both the horizontal and vertical directions. Each portion of the imagery may be associated with a relative angle value. By way of example, vertical directions may be referenced relative to a gravity vector, where 0° in the vertical direction may correspond with the horizon, −90° in the vertical direction may represent the view looking straight down and 90° in the vertical direction may represent the view looking straight up. Horizontal directions may correspond with compass bearings. For instance, 0° in the horizontal direction may correspond with due north, and 90°, 180° and 270° in the horizontal direction may correspond with due east, south and west, respectively. The horizontal coordinate of the photo sphere corresponds with an azimuth angle, and the vertical coordinate corresponds with an elevation angle.

The orientation of the sphere relative to compass bearings may be measured and stored based upon readings from a magnetic compass. For example, at the time the user of a mobile device (such as a phone) begins capturing a scene with the device's camera for the purpose of creating a photo sphere, the device may identify the orientation based on the device's internal compass and the gravity vector based on the device's internal accelerometer. The orientation may be defined with respect to a vector that is orthogonal to the gravity vector and points north. The orientation may also be identified by using a device's gyroscope to measure changes in the device's yaw relative to an initial compass bearing. The device may also store the date, time and geographic location at the time of capture as well.

Various factors may interfere with the accuracy of the information received from the device's location devices, such as the compass, GPS, accelerometer, etc. For instance, many magnetic compasses require periodic calibration to maintain accuracy and reduce accumulated magnetic effect. Moreover, neighboring concrete-steel structures or mineral deposits may distort the magnetic field at the capture location. Additionally, poor or no signal reception may affect the accuracy of location provided by the GPS.

The orientation of the photo sphere may be used when displaying the photo sphere to users. For example, a viewer may request to view a specific direction of a photo sphere (e.g., either by interacting with the photo sphere itself, through a map-based control, programmatically, etc.).

BRIEF SUMMARY

Aspects of the disclosure provide a method. The method includes receiving, by one or more processing devices, an image and associated pose data. One or more places captured within the image, may be determined by the one or more processing devices, each place having a respective known location. The one or more processing devices may annotate the image with the one or more places and minimize a difference between each annotation and its respective known location to obtain updated pose data of the image. The associated pose data may be updated to the updated pose data.

In some examples, the image is a 360-degree spherical or cylindrical panorama and the pose data includes orientation data and location data. In some instances, the orientation data includes data representing a direction a device was positioned at the time of capturing at least a portion of the image and the location data includes the location at which the image was captured. In some examples, at least three locations are annotated.

In some examples, minimizing a difference between each annotation and its respective known location includes determining, for each annotation and each known location, orientation information. In some instances, the orientation information of each annotation is measured clockwise from true north and is found using the following equation: $\beta_i = \alpha - \pi + x_i * 2\pi$, where $\beta_i$ is the angle between true north and the annotation, $x_i$ is the horizontal location of the annotation and between 0-1 with 0 representing a first border of the image and 1 representing a second, opposite border of the image, and $\alpha$ is the angle between true north and a mid-point of the image. In some instances the orientation information of each known location is measured clockwise from true north.

In some examples minimizing the difference between each annotation and its respective known location to obtain updated pose data of the image includes minimizing the following function for all places 1-i:

$$\Sigma_i \sin^2 \frac{TurnAngle(\text{lat}_n, \text{lng}_n, \text{lat}_i, \text{lng}_i) - \alpha_n + \Pi - x_i * 2\Pi}{2},$$

where ($\text{lat}_n$, $\text{lng}_n$) represents a new location for the image, $\alpha_n$ represents a new orientation for the image, ($\text{lat}_i$, $\text{lng}_i$) represent a location of the current place, and $x_i$ represents the horizontal coordinate location of the current annotation.

Another aspect of the disclosure provides a system that includes one or more processors and a memory storing instructions. The instructions are executable by the processor and include: receiving an image and associated pose data; determining one or more places captured within the image, each place having a respective known location; annotating the image with the one or more places; minimizing a difference between each annotation and its respective known location to obtain updated pose data of the image; and updating the associated pose data to the updated pose data.

Still another aspect includes a non-transitory computer-readable medium storing instructions, which when executed by a process, cause the processor to execute the following method: receive an image and associated pose data; determine one or more places captured within the image, each place having a respective known location; annotate the image with the one or more places; minimize a difference between each annotation and its respective known location to obtain updated pose data of the image; and update the associated pose data to the updated pose data.

DETAILED DESCRIPTION

Overview

Figure 1:
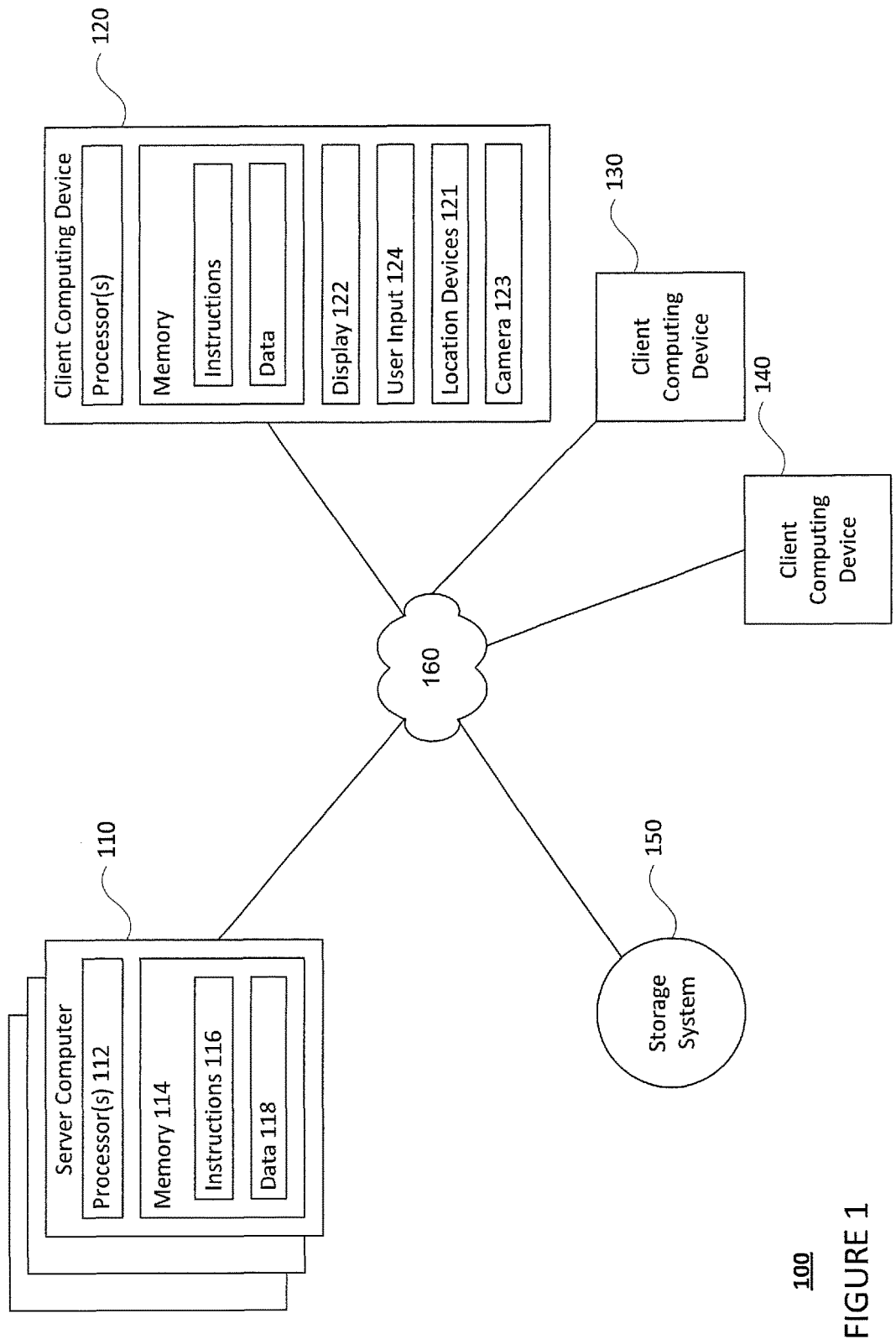
FIG. 1 is a functional diagram of a system in accordance with aspects of the disclosure.

The technology relates to optimizing location and orientation information of a 360-degree spherical image such as a photo sphere, or cylindrical panorama, using known locations of places captured within the image. In this regard, the pose data may include location data, such as the longitude and latitude coordinates indicating where the device which captured the image was positioned. The pose data may further include orientation data representing the direction the device was positioned at the time of capturing at least a portion of the image Such pose data is typically used to provide an estimated location and orientation of the image, as the information is generally determined from sensors which provide imprecise data. For instance, various factors may interfere with the accuracy of the pose data received from the device's location devices such as a compass, GPS, accelerometer, etc. To address these problems with the pose data, the pose data of the image may be optimized relative to known locations captured within the image. In this regard, the image may be analyzed and the position of places with known coordinates may be annotated into the image. The pose data of the image may be adjusted by having projections of the annotations align with their respective known coordinates.

The image may be analyzed to determine whether it contains imagery of places with known locations. In this regard, places having known locations, such as a known latitude and longitude, may be stored in a database in association with their respective location information. The places may include landmarks, buildings or other structures, points of interest, signs, or any other visual objects or collection of objects having known locations. Places captured within the image having known locations may be annotated into the image.

The image's pose data may be manipulated to minimize the difference between the location of the annotations within the image and their respective known locations. In other words, the pose data for the image, including its location and orientation, may be adjusted such that projections of the annotations align with their respective known coordinates. The amount of rotation needed to align each annotation with its respective known location may differ for different annotations within the same image, so the location of the image may need to be shifted to a new location in addition to the orientation of the image being rotated to a new orientation. In this regard, the image may be reoriented and relocated to minimize the differences between each annotation with its respective known location. The difference between each annotation with its respective known location may be minimized by minimizing the sum of squared distances between the location of each annotation in the image and its known location.

The features described herein allow for the optimization of pose of a image originally associated with inaccurate location data. By doing so, mapping data, image viewers, and other such programs and data which rely on images may provide have more reliable location information. Further, users may be provided an intuitive and consistent transition when navigating between images which capture similar areas, as the images may be oriented consistently.

Example Systems

Figure 2:
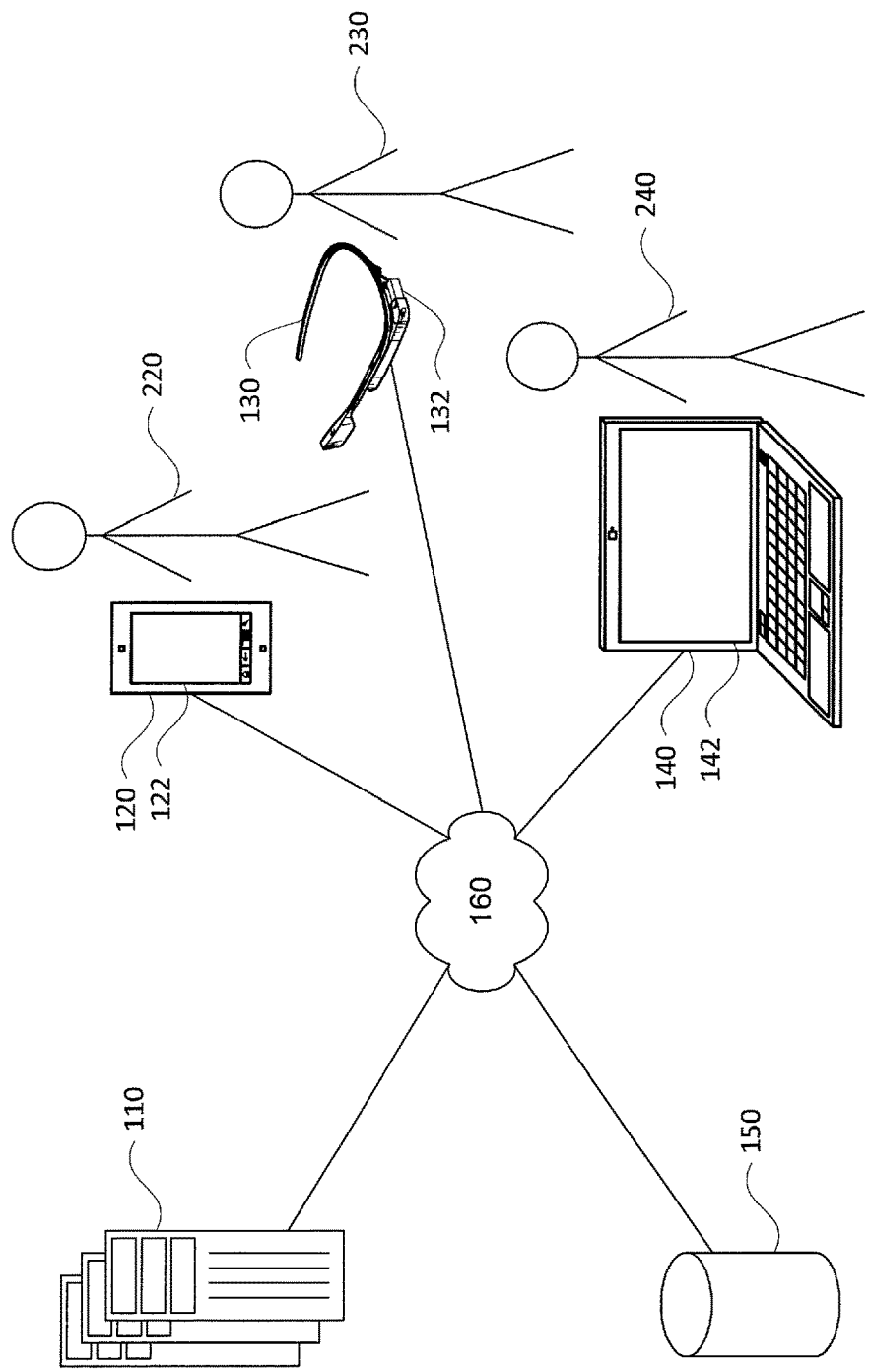
FIG. 2 is a pictorial diagram of the example system of FIG. 1.

FIGS. 1 and 2 show an example system 100 in which the features described herein may be implemented. It should not be considered as limiting the scope of the disclosure or usefulness of the features described herein. In this example, system 100 may include computing devices 110, 120, 130, and 140 as well as storage system 150. Each computing device may contain one or more processors 112, memory 114 and other components typically present in general purpose computing devices. Memory 114 of each of computing devices 110, 120, 130, and 140 may store information accessible by the one or more processors 112, including instructions 116 that can be executed by the one or more processors 112.

The memory may store data that can be retrieved, manipulated or stored by one or more processors. The memory may be of any non-transitory type capable of storing information accessible by the processor, such as a hard-drive, memory card, ROM, RAM, DVD, CD-ROM, write-capable, and read-only memories. Data elements, such as instructions 116 and data 118, may be held in memory spaces.

The instructions 116 may be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored, and modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor.

Although FIG. 1 functionally illustrates the processor, memory, and other elements of the computing devices as being within the same block, the processor, computer, computing device, or memory can actually comprise multiple processors, computers, computing devices, or memories that may or may not be stored within the same physical housing. For example, the memory 114 can be a hard drive or other storage media located in housings different from that of the computing device 110.

References to a processor, computer, computing device, or memory will be understood to include references to a collection of processors, computers, computing devices, or memories that may or may not operate in parallel. For example, the computing device 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices can be at different nodes of a network 160 and capable of directly and indirectly communicating with other nodes of network 160. Although only a few computing devices 110, 120, 130, and 140 are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices, and may perform all or some of the features described herein.

Each of the client computing devices 120, 130, and 140 may be configured similarly to the server computing devices 110, with one or more processors, memory and instructions as described above. Each client computing device 120 or 130 may be a personal computing device intended for use by a user 220 or 230, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen, or microphone). The client computing device may also include a camera 123 for recording video streams and/or capturing images, speakers, a network interface device, and all of the components used for connecting these elements to one another. In some instances the camera may combine frames of one or more video streams together to generate a 360-degree spherical or cylindrical panorama. The device may also associate the date and time that the imagery was captured with the imagery.

The client devices, such as client device 120 may include a component, such as circuits or sensors, to determine the geographic location and orientation of the device. For example, client device 120 may include location devices 121, such as a GPS device, a magnetic compass, accelerometer and/or gyroscope to determine the device's latitude, longitude, altitude, and orientation. By way of example only, the client device may determine its pitch, yaw or roll (or changes thereto) relative to the direction of gravity or a plane perpendicular thereto and its location such as latitude and longitude from a GPS signal. Orientation information may be determined by a compass and additional orientation information may be provided by other location devices 121 such as an accelerometer that maps portions of the imagery within an image relative to vector that corresponds with gravity (e.g., straight down), a gyroscope that maps portions of the imagery relative to an initial yaw value. Yet further, the device may associate yaw values with the then-current compass bearing based on the output of compass. In some instances, the location devices may also comprise software for determining the position of the device based on other signals received at the client device 120, such as signals received at a cell phone's antenna from one or more cell phone towers if the client device is a cell phone. The device may further associate a geographic location proximate to the camera with captured images, e.g., the latitude, longitude and altitude output by location devices 121. For instance, the image data, date, time, location and compass direction may be stored in a file and uploaded by the client device to server 110.

Although the client computing devices 120, 130, and 140 may each comprise a full-sized personal computing device, they may alternatively comprise mobile computing devices capable of exchanging data with a server, such as server computing device 110, over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a tablet or laptop computer. In an additional example, client computing device 140 may be a digital camera, such as a 360-degree camera or digital single-lens reflex camera. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

Map-related information may be stored in the memory 114 or storage system 150, at least a portion of which may be retrieved by a client device. The map-related information is not limited to any particular format. For instance, the map-related information may include street locations and pedestrian trails as latitude/longitude/altitude-based vectors and other such features associated with geographic locations. For example, other geographic features may include the location of a landmark, a store, a lake, a point of interest, or any other visual object or collection of objects at a given location.

Locations may be expressed in various ways including, by way of example only, latitude/longitude/altitude, a street address, x-y coordinates relative to edges of a map (such as a pixel position relative to the edge of a street map), and other reference systems capable of identifying geographic locations (e.g., lot and block numbers on survey maps). The system and method may further translate locations from one reference system to another. For example, the server 110 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939°)). In that regard, locations received or processed in one reference system may also be received or processed in other references systems.

Example Methods

Operations in accordance with a variety of aspects of the invention will now be described. It should be understood that the following operations do not have to be performed in the precise order described below. Rather, various steps can be handled in a different order or simultaneously.

An image may be captured with a computing device, such as computing device 120. During or upon completion of capturing the image, the image may be associated with pose data. In this regard, the image may be associated with pose data including a location corresponding to where the image was captured and an orientation corresponding to the direction the device which captured the image was positioned when capturing at least a portion of the image. Such pose data may be determined from sensors, such as location devices 121, which may provide imprecise data.

Figure 3:
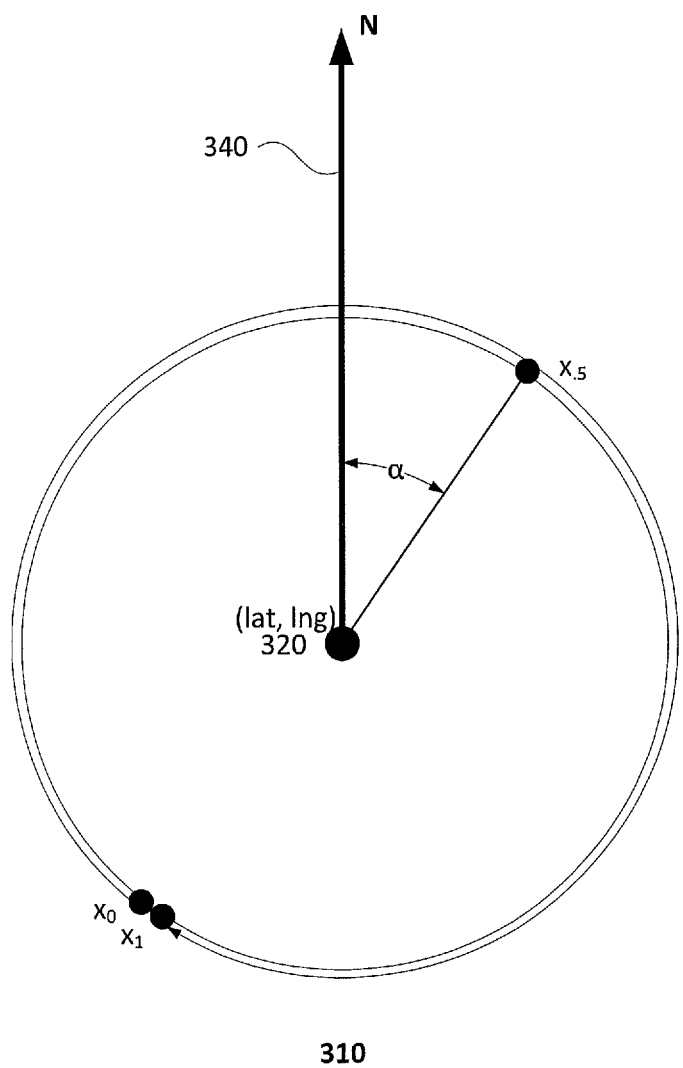
FIG. 3 is an example of an orientation of an example image in accordance with aspects of the disclosure.

By way of example, FIG. 3 shows a top down view of a 360-degree cylindrical panorama 310, captured at a location 320 with planar coordinates "lat, lng". The orientation of the image 310 may be determined based on a center or midpoint of the image relative to true north 340. In the example of FIG. 3, the image's starting and ending points are $x_0$ and $x_1$, respectively, with $x_{0.5}$ being the mid-point. The starting point of the photo, $x_0$, may be the direction at which the device which captured the image was directed at the start of capturing the image and the ending point of the photo $x_1$, may be the direction at which the device which captured the image was directed at the end of capturing the image. The orientation of the image 310 is calculated as the angle α, measured clockwise from true north 340 to the mid-point $x_{0.5}$.

The pose data of the image may be optimized relative to known locations captured within the image to provide more precise pose data. For instance, the image may be analyzed using feature matching techniques to determine whether any portions of the image capture a place having a known location in the database. In this regard, places having known locations, such as a known latitude and longitude, may be stored in a database in association with their respective location information. The image may be analyzed to determine whether places are present in the image and the places found within the image may be compared to the places having known locations in the database to determine if there is a match. An example feature matching technique may include scale-invariant feature transform (SIFT). To increase the analysis speed, only a subset of the places within a predefined distance from the image's location may be included in the analysis. For example, the subset of places may include only places with known locations within 1000 feet, or more or less, of the location data of the image.

Figure 4:
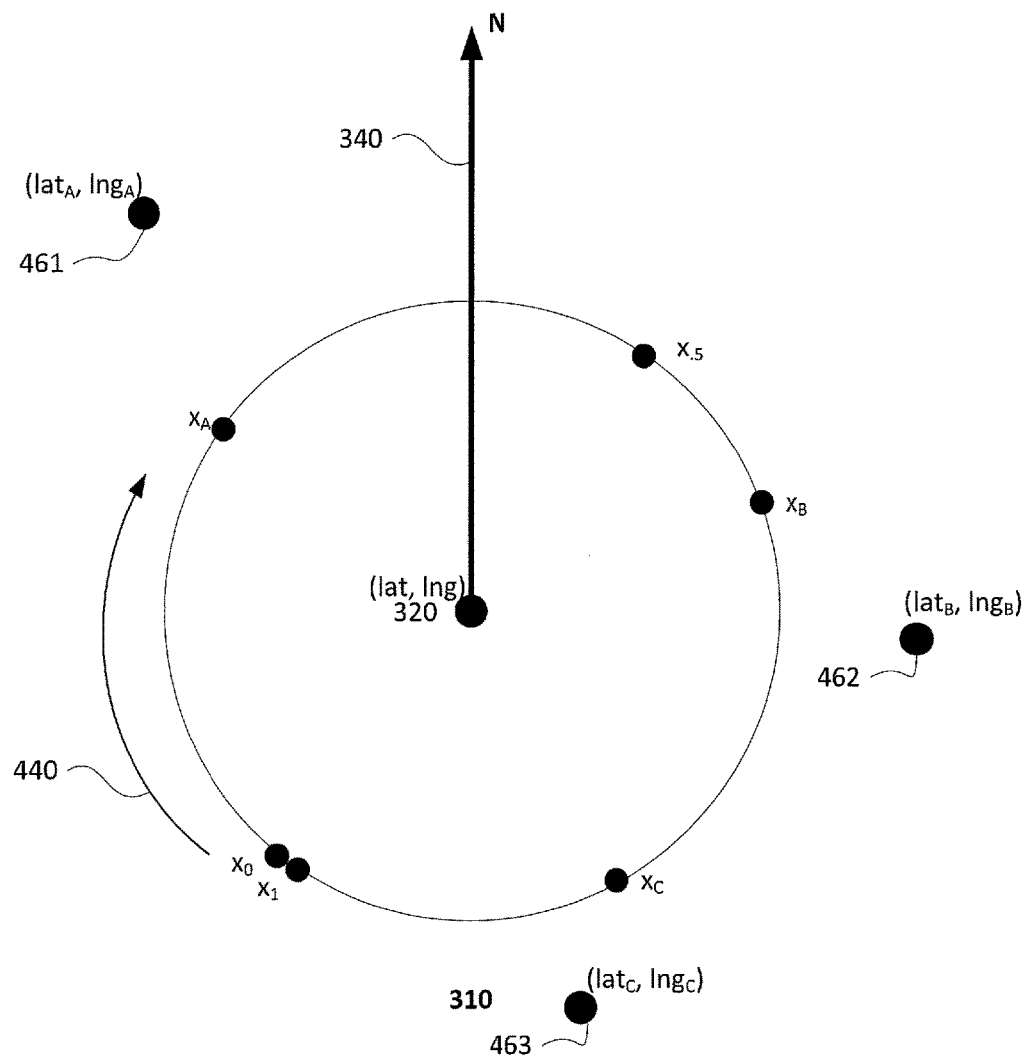
FIG. 4 is an example of annotating places in an example image in accordance with aspects of the disclosure.

Places captured within the photo having known locations may be annotated into the photo. For example, as shown in FIG. 4, the photo 310 may be analyzed using a feature matching technique found to have captured three places A, B, and C, having known locations $(lat_A, lng_A)$ 461, $(lat_B, lng_B)$ 462, and $(lat_C, lng_C)$ 463, respectively. The annotations of the known places within the photo are shown as $x_A$, $x_B$, and $x_C$, respectively. In this regard, each annotation may be a normalized distance from a starting point of the photo, $x_0$, in a first direction 440, although the normalized distance may also be from an ending point of the photo, $x_1$, in an opposite direction. Although not shown, the image may capture places in a third dimension, such as an altitude, relative to a gravity vector. Although only three places are shown, more places may be annotated. In some instances, a user may manually annotate places having known locations into the image.

The pose data of the image may be adjusted to minimize the difference between the location of the annotations within the image and their respective known locations. In other words, the pose data, including location and orientation, may be adjusted such that projections of the annotations align, or substantially align, with their respective known coordinates. In this regard, the difference between each orientation of an annotation in the image and the orientation of its corresponding known location may be found.

Figure 5:
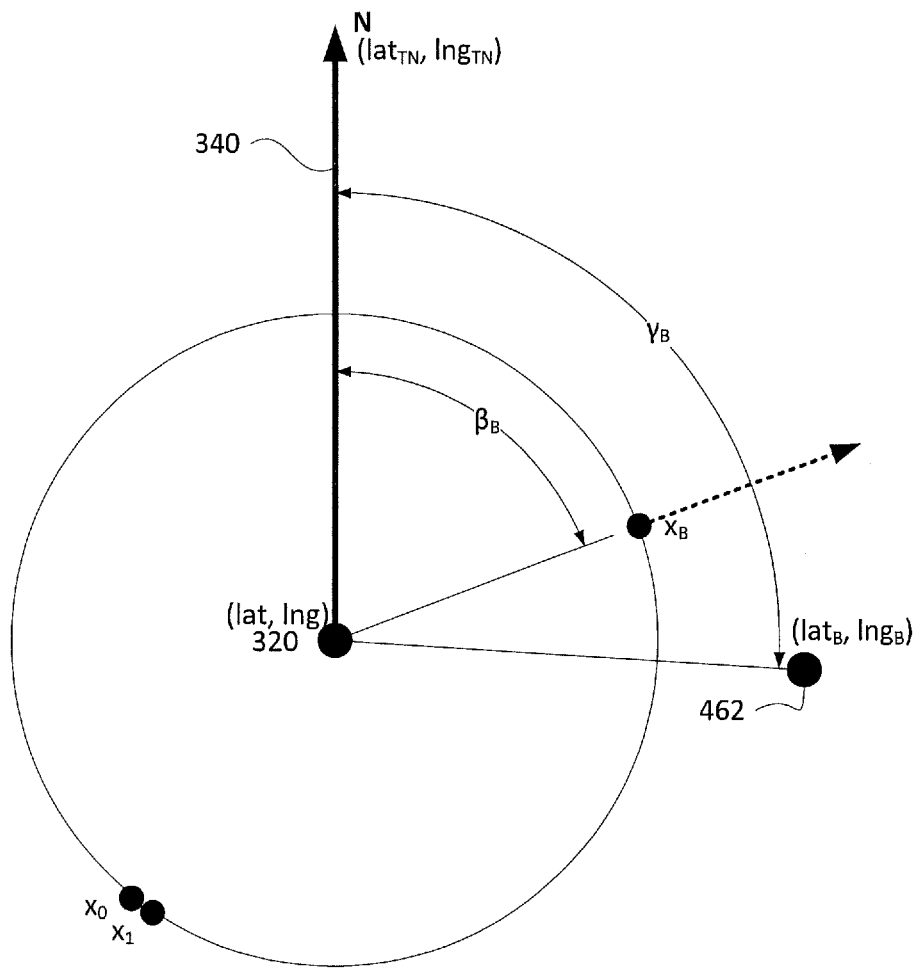
FIG. 5 is an example of determining an updated orientation of an example image in accordance with aspects of the disclosure.

For example, as shown in FIG. 5, $\beta_B$ is the orientation of annotation $x_B$ in the image as measured clockwise from true north 340 to the annotation $x_B$. $\beta_B$ may be found using the known orientation of the image, α, such that $\beta_B = \alpha - \pi + x_B * 2\pi$. The orientation of the known location 462 of place B, $\gamma_B$, as measured in spherical coordinates, $(lat_B, lng_B, altitude)$, clockwise from true north 340 as further shown in FIG. 5, may be determined using a helper function TurnAngle. In this regard, the TurnAngle helper function calculates the angle between the image's coordinates (lat, lng) 320 to true north 340 and the image's coordinates (lat, lng) 320 to the location of an annotated places known coordinates, such as $(lat_B, lng_B)$ 462 of place B. For instance, the TurnAngle function may determine angle γB as the angle between the geodesic located between the true north direction at image's coordinates (i.e., the geodesic between the image coordinates (lat, lng) and the north pole $(lat_{tn}, lng_{tn})$) and the geodesic between the image coordinates (lat, lng) and the known location $(lat_B, lng_B)$ of place B). The projection of annotation of place B, $x_B$, may be aligned with the known location $(lat_B, lng_B)$ 462 of place B, by rotating the orientation of the image by a distance equal to the difference between $\gamma_B$ and $\beta_B$.

Figure 6:
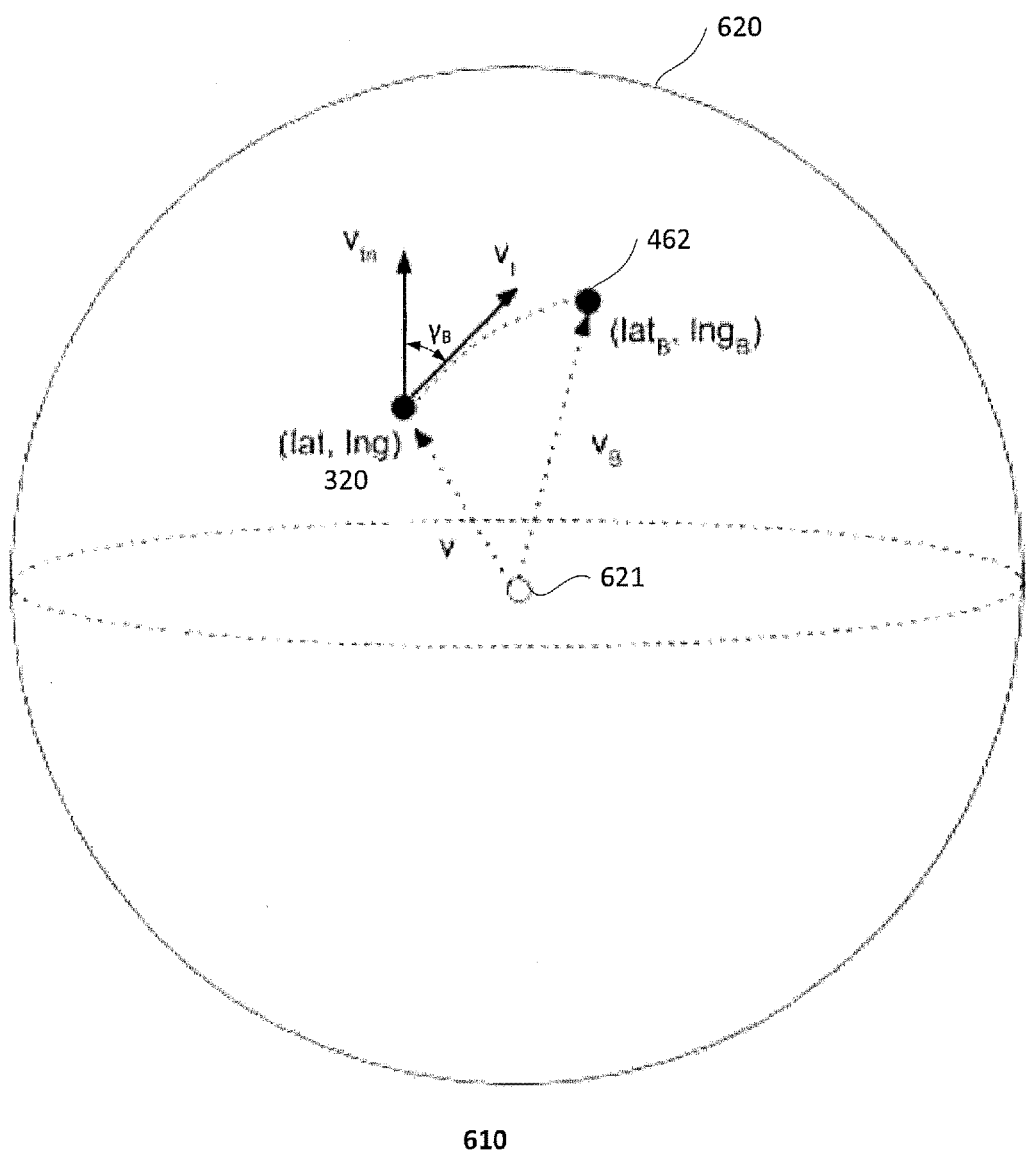
FIG. 6 is a three-dimensional illustration of an image positioned relative to a known location in accordance with aspects of the disclosure.

FIG. 6 shows a three-dimensional illustration 610 of the image positioned relative to the known location $(lat_B, lng_B)$ 462 of place B. The angle $\gamma_B$ is the angle between vectors $v_{tn}$ and $v_t$. The TurnAngle function may determine angle $\gamma_B$ by calculating the value of $\gamma_B = \text{a tan } 2(v_t \cdot v_{tn}, v \cdot (v_t \times v_{tn}))$. In this regard, v is a unit vector that points from the center of the globe 621 to (lat, lng) 320 and may be determined as v=(cos lat cos lng, cos lat sin lng, sin lat), $v_B$ is a unit vector that points from the center of the globe 621 to $(lat_B, lng_B)$ 462 and may be determined as $v_B = (\cos lat_B \cos lng_B, \cos lat_B \sin lng_B, \sin lat_B)$, and $v_{tn}$ is the unit vector of true north (i.e., (0,0,1)). $v_t$ is a is a unit vector that is tangent to the globe 620 and on the geodesic between points from the image coordinates (lat, lng) towards the known location $(lat_B, lng_B)$ 462 of place B. $v_t$ may be found by determining $v_t=v_p \times v$, where $v_p$ is the normal of the plane that (lat, lng), (lat$_B$, lng$_B$), and the center of the globe 621 reside in (i.e., $v_p$=normalized $(v \times v_B)$).

Figure 7:
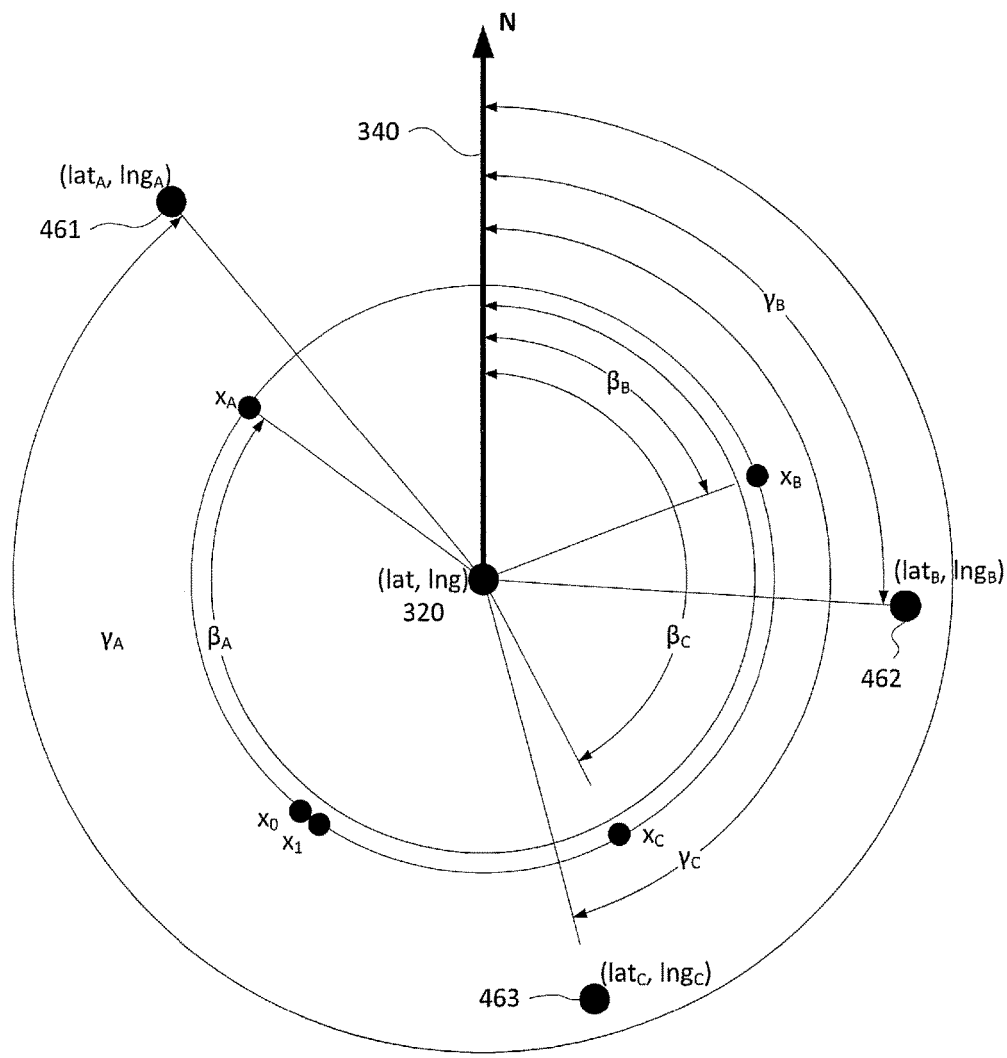
FIG. 7 is another example of determining an updated orientation of an example image in accordance with aspects of the disclosure.

The $\beta$ and $\gamma$ for each annotation and known location may be found, as shown in FIG. 7. In this regard $\gamma_A$ and $\beta_A$ may be found for the known location (lat$_A$, lng$_A$) 461 of place A and the annotated location of place A, $x_A$, respectively. Similarly $\gamma_C$ and $\beta_C$ may be found for the known location (lat$_C$, lng$_C$) 463 of place C and the annotated location of place C, $x_C$, respectively. The distance between $\gamma_C$ and $\beta_C$, $\gamma_A$ and $\beta_A$, and $\gamma_B$ and $\beta_B$ may be different and, as such, it may not be possible to simultaneously align the projection of the annotations of places A, B, and C, with their respective known locations.

Figure 8:
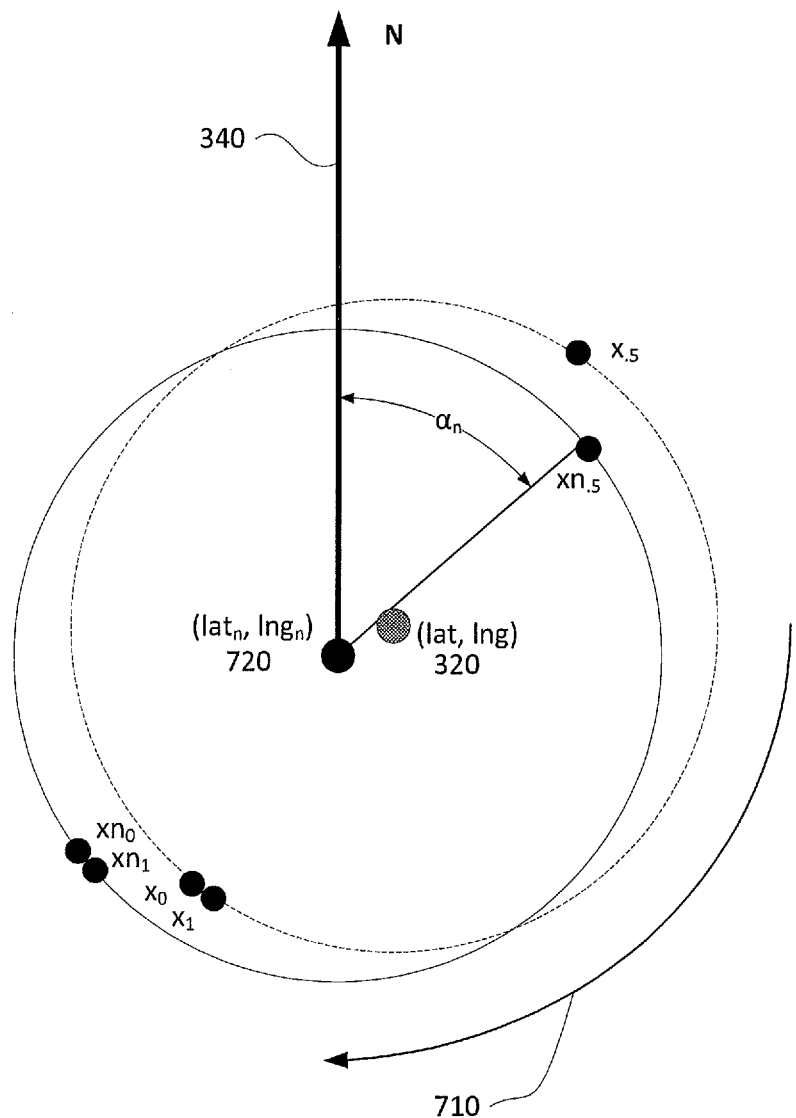
FIG. 8 is an example of determining updated pose data in accordance with aspects of the disclosure.

To minimize the differences between each annotation with its respective known location, the location and orientation of the pose data may be adjusted. In other words, the image may be "relocated" in addition to being "reoriented". In this regard, the amount of rotation needed to align each annotation with its respective known location may differ for different annotations within the same image, so the location of the image may need to be shifted to a new location in addition to the orientation of the image being rotated to a new orientation. The difference between each annotation with its respective known location may be minimized by minimizing the sum of squared distances between the location of each annotation in the image and its known location. The new location (lat$_n$, lng$_n$) 720 and the new orientation $\alpha_n$, as shown in FIG. 8, may be found by minimizing the following cost function formula for all places (A . . . i):

$$f = \Sigma_i \sin^2 \frac{\gamma_i - \beta_i}{2} = \Sigma_i \sin^2 \frac{TurnAngle(\text{lat}_n, \text{lng}_n, \text{lat}_i, \text{lng}_i) - \alpha_n + \Pi - x_i * 2\Pi}{2}$$

Upon minimizing the cost function formula for all annotated places in the image, the location of the pose data may be updated to a new location and the orientation of the pose data rotated such that the difference between the location of each annotation in the image and its known location are minimized. For example, as shown in FIG. 8, the image 310 may be repositioned to a new location 720 at coordinates (lat$_n$, lng$_n$) and rotated in a direction, such as direction 710, such that the repositioned image's mid-point, $xn_{0.5}$, is at new orientation $\alpha_n$. Such repositioning and rotation of the image 310 may result in each annotation in the image 310 being closely aligned with its known location.

Figure 9:
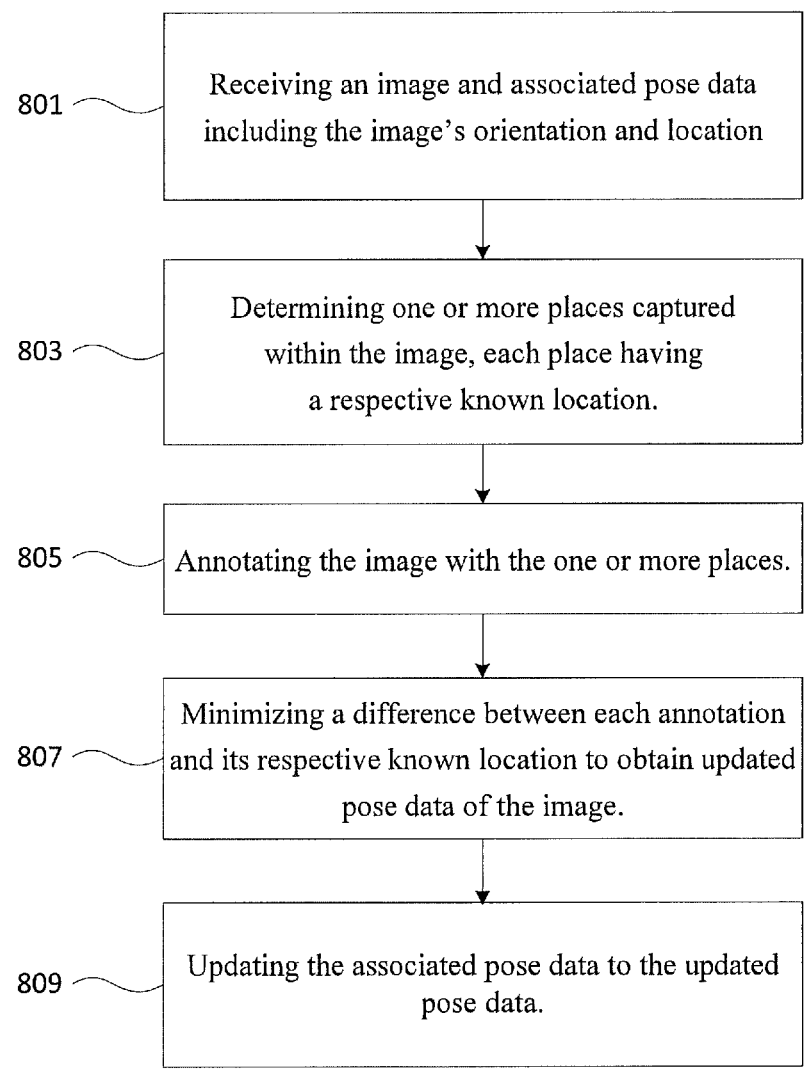
FIG. 9 is an example flow diagram in accordance with aspects of the disclosure.

FIG. 9 is a flowchart in accordance with some of the aspects described above. At block 801, an image and associated pose data including the image's orientation and location are received. One or more places captured within the image are determined, and the image is annotated with the one or more places, each place having a respective known location, as shown in blocks 803 and 805. A difference between each annotation and its respective known location to obtain updated pose data of the image may be minimized as shown in block 807. The associated image pose data is updated to the adjusted image pose data as shown in block 809.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method for adjusting an image's pose, comprising:
   receiving, by one or more processing devices, an image and associated pose data including an image's orientation and a location of the image;
   determining, by the one or more processing devices, one or more places captured within the image, each place having a respective known location;
   annotating, by the one or more processing devices, the image with the one or more places;
   minimizing, by the one or more processing devices, a difference between each annotation and its respective known location to obtain updated pose data of the image, wherein minimizing the difference to obtain updated pose data includes adjusting the image's pose by shifting the image, rotating the image or both, to align each annotation and its respective known location; and
   updating, by the one or more processing devices, the associated pose data to the updated pose data.

2. The computer-implemented method of claim 1, wherein the image is a 360-degree spherical or cylindrical panorama.

3. The computer-implemented method of claim 2, where the image's orientation includes data representing a direction a device was positioned at a time of capturing at least a portion of the image and the location of the image includes a location at which the image was captured.

4. The computer-implemented method of claim 3, wherein minimizing a difference between each annotation and its respective known location includes determining, for each annotation and each known location, orientation information.

5. The computer-implemented method of claim 4, wherein the orientation information of each annotation is measured clockwise from true north and is found using the following equation:

$$\beta i = \alpha - \pi + x_i * 2\pi$$

where $\beta_i$ is an angle between true north and the annotation, $x_i$ is the location of the annotation, and $\alpha$ is the angle between true north and a mid-point of the image.

6. The computer-implemented method of claim 4, wherein the orientation information of each known location is measured clockwise from true north.

7. The computer-implemented method of claim 1, wherein at least three locations are annotated.

8. The computer-implemented method of claim 1, wherein minimizing the difference between each annotation and its respective known location to obtain updated pose data of the image includes minimizing the following function for all places 1-i:

$$\Sigma_i \sin^2 \frac{TurnAngle(\text{lat}_n, \text{lng}_n, \text{lat}_i, \text{lng}_i) - \alpha_n + \Pi - x_i * 2\Pi}{2},$$

where (lat$_n$, lng$_n$) represents a new location for the image, $\alpha_n$ represents a new orientation for the image, (lat$_i$,lng$_i$)

represent a location of a current place, and $x_i$ represents the location of a current annotation.

9. A system comprising:
one or more processors; and
memory storing instructions, the instructions executable by the processor, wherein the instructions comprise:
receiving an image and associated pose data including an image's orientation and a location of the image;
determining one or more places captured within the image, each place having a respective known location;
annotating the image with the one or more places;
minimizing a difference between each annotation and its respective known location to obtain updated pose data of the image, wherein minimizing the difference to obtain updated pose data includes adjusting a pose of the image by shifting the image, rotating the image or both, to align each annotation and its respective known location; and
updating the associated pose data to the updated pose data.

10. The system of claim 9, wherein the image is a 360-degree spherical or cylindrical panorama.

11. The system of claim 10, where orientation data includes data representing a direction a device was positioned at a time of capturing at least a portion of the image and location data includes a location at which the image was captured.

12. The system of claim 11, wherein minimizing a difference between each annotation and its respective known location includes determining, for each annotation and each known location, orientation information.

13. The system of claim 10, wherein orientation information of each known location is measured clockwise from true north.

14. The system of claim 9, wherein at least three locations are annotated.

15. The system of claim 14, wherein orientation information of each annotation is measured clockwise from true north and is found using the following equation:

$$\beta i = \alpha - \pi + x_i * 2\pi$$

where $\beta_i$ is an angle between true north and the annotation, $x_i$ is the location of the annotation, and $\alpha$ is an angle between true north and a mid-point of the image.

16. The system of claim 9, wherein minimizing the difference between each annotation and its respective known location to obtain updated pose data of the image includes minimizing the following function:

$$\Sigma_i \sin^2 \frac{TurnAngle(\text{lat}_n, \text{lng}_n, \text{lat}_i, \text{lng}_i) - \alpha_n + \Pi - x_i * 2\Pi}{2},$$

where $(\text{lat}_n, \text{lng}_n)$ represents a new location for the image, $\alpha_n$ represents a new orientation for the image, $(\text{lat}_i, \text{lng}_i)$ represent a location of a current place, and $x_i$ represents the location of a current annotation.

17. A non-transitory computer-readable medium storing instructions, which when executed by a processor, causes the processor to execute the following method:
receive an image and associated pose data including an image's orientation and a location of the image;
determine one or more places captured within the image, each place having a respective known location;
annotate the image with the one or more places;
minimize a difference between each annotation and its respective known location to obtain updated pose data of the image, wherein a pose of the image is adjusted by shifting the image, rotating the image or both, to align each annotation and its respective known location; and
update the associated pose data to the updated pose data.

18. The non-transitory computer-readable medium of claim 17, wherein the image is a 360-degree spherical or cylindrical panorama.

19. The non-transitory computer-readable medium of claim 18, where orientation data includes data representing a direction a device was positioned at a time of capturing at least a portion of the image and location data includes a location at which the image was captured.

20. The non-transitory computer-readable medium of claim 17, wherein at least three locations are annotated.

* * * * *